July 14, 1942.  G. A. WAHLMARK  2,290,080
VALVE
Filed July 20, 1940
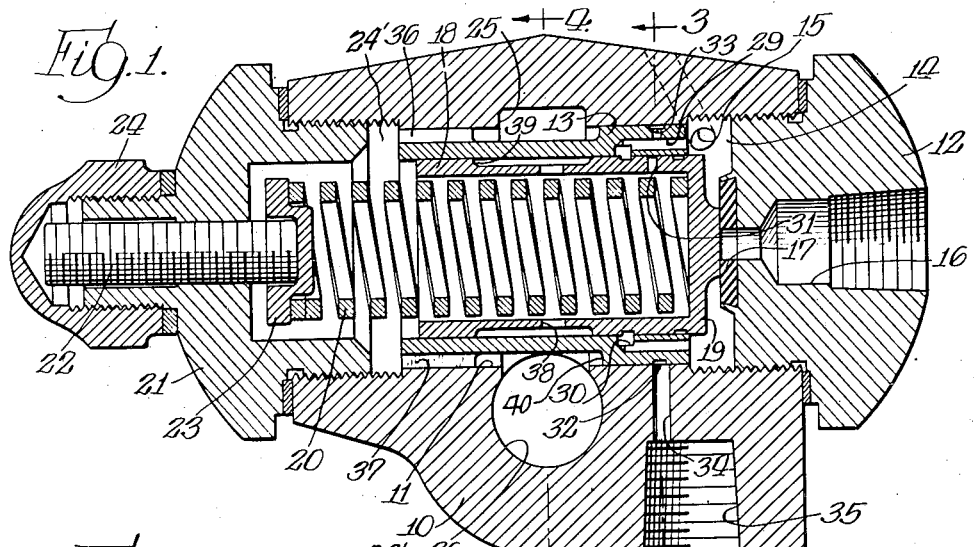
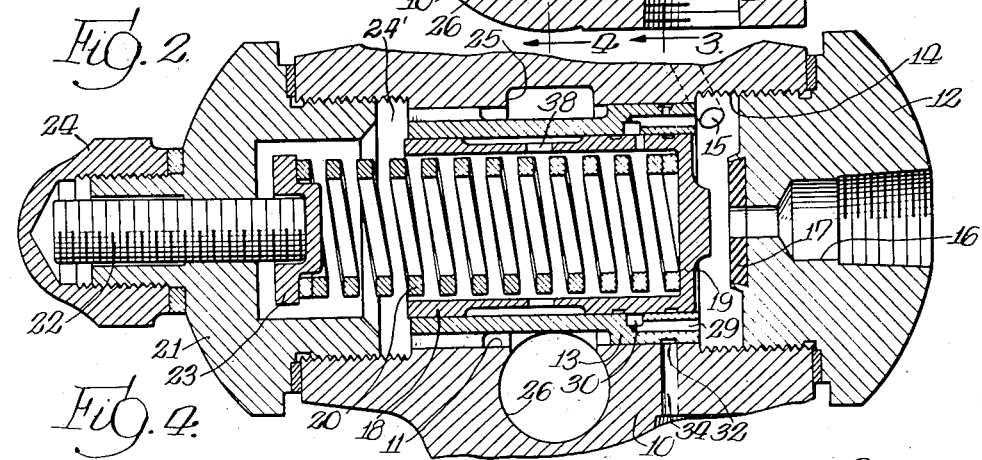
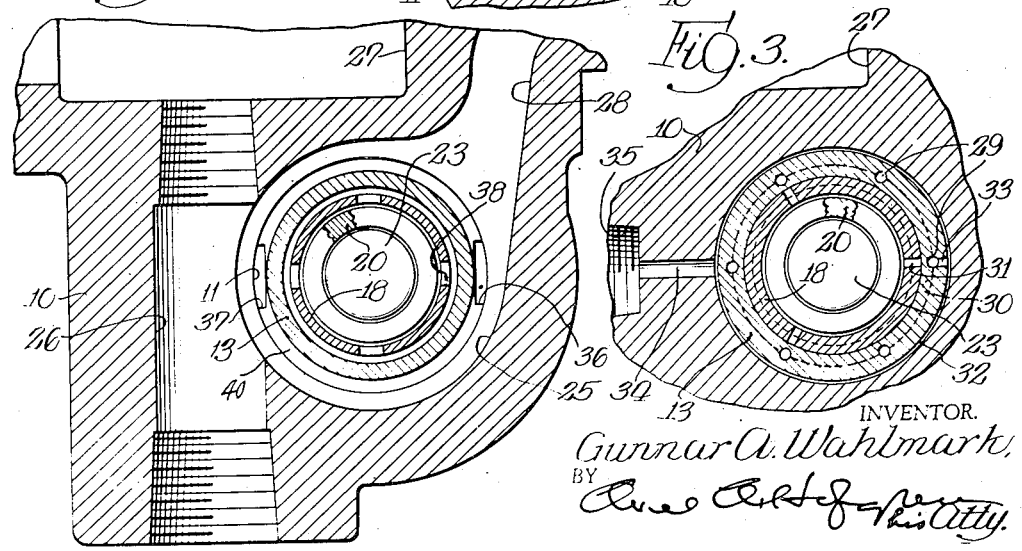
INVENTOR.
Gunnar A. Wahlmark,
BY
his Atty.

Patented July 14, 1942

2,290,080

UNITED STATES PATENT OFFICE 2,290,080

VALVE

Gunnar A. Wahlmark, Rockford, Ill.

Application July 20, 1940, Serial No. 346,602

10 Claims. (Cl. 137—53)

The invention relates generally to valves and more particularly to a cut-off valve including by-pass means.

A general object of the invention is to provide a new and improved valve of the character described.

A more particular object of the invention is to provide a valve which is balanced and which, moreover, has its by-pass control ports so constructed and so arranged as to reduce pulsations to a minimum.

Another object is to provide a valve having by-pass control ports spaced inwardly from the end of the valve where less subject to wear.

A further object is to provide a valve in which the by-passed fluid is directed longitudinally of the valve to reduce churning of the fluid.

Other objects and advantages will become apparent from the following detailed description taken in connection with the accompanying drawing, in which:

Fig. 1 is a diametrical sectional view of a valve embodying the features of the invention, the valve being shown in normal closed position.

Fig. 2 is a diametrical sectional view similar to Fig. 1, but showing the valve shifted to open position.

Fig. 3 is a transverse sectional view taken approximately along the line 3—3 of Fig. 1.

Fig. 4 is a transverse sectional view taken approximately along the line 4—4 of Fig. 1.

The valve mechanism forming the subject of this invention is particularly, but not exclusively, adapted for use with an oil burner pump of a type such as that disclosed and claimed in my copending application Serial No. 212,475, filed June 8, 1938. Such a valve mechanism generally is operable to control the discharge of fluid from the pumping unit and preferably functions only after the discharge pressure has attained a predetermined value. Should the discharge pressure exceed the predetermined value, due to an obstruction in the discharge pipe or nozzle, or for any other reason, the valve mechanism is arranged to by-pass a portion of the fluid either to the source of supply or directly to the pump. Frequently, as shown in my above mentioned application, the valve mechanism is formed as a part of the pumping unit. Herein the valve mechanism is illustrated in such environment, hence the irregularities of the casing in certain views of the drawing.

Housing the valve is a casing 10 having a bore 11 extending completely therethrough. Closing one end of the bore 11 is a bushing 12 screw threaded into the end of the bore, while pressed into the central portion of the bore is a sleeve 13. The sleeve is spaced longitudinally from the bushing 12 so as to form in the bore between adjacent ends of the bushing and of the sleeve a valve chamber 14 having opening thereinto a fluid inlet port 15 through which pressure fluid is discharged from the pumping unit. The bushing 12 contains the main discharge or outlet port 16 which is formed in part by the hole in a leather or other composition washer 17 secured in a recess in the inner end of the bushing 12.

A hollow piston valve 18 is slidably mounted in the sleeve 13 so that its closed operative end 19 will be subjected to the fluid in the valve chamber 14. This valve is held seated against the washer 17 to close the fluid outlet port 16 by means of a coiled spring 20 which is positioned within the hollow piston valve with one end bearing against the closed operative end 19 of the piston valve 18. A cap member 21, screw threaded in the end of the bore opposite the bushing 12 to close the same, carries a screw device 22 which projects through the cap member and at its inner end engages in a cup-shaped member 23 seated against the adjacent end of the coiled spring 20 to provide for adjusting the pressure of the spring on the piston valve and thereby the pressure at which the valve opens. Preferably a removable closure 24 is threaded onto the cap 21 so as to protect the adjusting device 22, while facilitating access thereto for the purpose of rotating the device to adjust the tension of the spring 20. The cap 21 terminates short of the end of the sleeve 13 to leave an annular space forming part of a chamber 24'.

In order to by-pass excess fluid, the piston valve 18 is also arranged to govern by-pass means which communicates with an annular passage 25 formed in the casing about the sleeve 13 (see Figs. 1 and 4). This annular passage 25 communicates with a bore 26 extending at right angles to the bore 11 and which in turn communicates at its upper end with the intake chamber 27 of the pump to provide an internal by-pass and at the other end opens to the exterior of the casing to provide an external by-pass. If the fuel unit and the valve mechanism are to be installed in what is generally referred to as a single pipe system, this internal by-pass is utilized for the excess fluid and the opposite end of the bore 26 is closed by means of a suitable plug. If, however, the fuel unit and the valve mechanism are to be used in a two pipe system, a suitable plug is placed in the inner end of the bore 26 to close the internal by-pass, while the outer end of the bore 26 is connected to the return pipe. The annular passage 25 also communicates with a passage 28 which leads to an auxiliary intake port of the pumping unit, as more clearly disclosed in my above mentioned copending application.

Unique by-pass porting and passages are provided which serve to reduce pulsations, reduce the churning of the by-pass fluid, and in other respects contribute to improved and more quiet operation of the valve mechanism, as well as the pump with which the valve is associated. To those ends, the sleeve 13 is formed with a plurality of small passages 29 extending longitudinally of the sleeve 13. These passages, as best seen in Fig. 3, are here shown as six in number and at one end open through the end of the sleeve 13 to communicate with the valve chamber 14, while at their other end they communicate with an annular groove 30 formed in the inner surface of the sleeve 13. The groove 30 and hence the passages 29 are normally closed by the piston valve 18 when the latter is in its normal closed position. In order to permit a by-passing of fluid through the passages 29 and groove 30 under the control of the piston valve 18, there is formed in the latter a plurality of small radial ports 31. These ports 31, as best seen in Fig. 3, are three in number, equally spaced about the piston valve 18, and are circular in cross section so that the control over the by-passed fluid is extremely minute. It is believed readily apparent from the foregoing that not only is the control over the by-passed fluid effected by this construction extremely minute, but that also, due to the fact that all of the by-passed fluid must pass through the three small radial ports 31, pulsations created by the pumping unit and any tendency on the part of the piston valve to oscillate will be minimized. Further, with the control ports 31 located inwardly of the end of the valve, accuracy of control is assured and, moreover, is attained for a longer time because the intermediate portion of the valve is more rigidly supported and thus not subject to the wear to which the end of the valve is subjected. Formed externally of the sleeve 13 is an annular groove 32 which communicates through the medium of a single radial passage 33 with one of the longitudinal passages 29 (see Fig. 1) and which communicates through a passage 34 with a port 35 for the reception of a pressure gauge.

From the radial ports 31 the by-passed fluid is caused to flow longitudinally of the piston valve through the open end of the valve to the bore 11 and thence longitudinally back to the annular passage 25 externally of the sleeve 13. To provide for such passage from the bore 11 to the annular passage 25 externally of the sleeve 13, the latter is cut away at 36 and 37, as best seen in Figs. 1 and 4, to provide longitudinal passages, and is formed with an external annular groove 40 registering with the groove 25. From the annular passage 25 the by-passed fluid then flows either to the bore 26 or the passage 28. Intermediate its ends, the piston valve 18 is formed with radial openings 38 to prevent trapping of fluid in the wide annular groove 39.

In order to provide an aid in the understanding of the function and operation of the valve mechanism, the operation thereof will be briefly described. Normally, the valve assumes the position shown in Fig. 1, that is, with the piston 19 closing the outlet port 16. In that position the by-pass passage also is closed. When fluid under pressure is caused to be supplied to the chamber 14 through the fluid inlet port 15, pressure builds up in the chamber and reacts on the end of the piston 19, tending to force the same to the left, as viewed in Fig. 1, against the action of the spring 20. As the piston moves to the left, it opens outlet port 16 and permits fluid under pressure to be discharged therethrough, the piston assuming a position intermediate the position shown in Figs. 1 and 2. Should an obstruction develop in the line connected to port 16, or should the rate of fluid supply through the inlet port 15 be in excess of the flow through the line connected to the port 16, pressure in the chamber 14 will build up and, as a result, will force the piston 19 still farther to the left until radial ports 31 register with groove 30, thereby opening the by-pass passage. This position is shown in Fig. 2 and fluid may now flow from the chamber 14 through longitudinal passages 29, groove 30, radial ports 31 to the interior of the piston 19, thence longitudinally of the piston and through the open end thereof to the chamber 24', and from the chamber 24' it again flows longitudinally through passages 36, 37 to annular grooves 25, 40 and bore 26. From the bore 26, this by-pass fluid is returned either directly to the intake chamber 27 of the pump if a one-pipe system is used, or otherwise it is discharged through the other end of bore 26 to the fluid reservoir if a two-pipe system is used. It will be apparent from the foregoing that the ports 31, controlling the by-passing of fluid, are spaced from the end of the piston 19 and thus are less subject to wear. It is also to be noted that with the ports 31 round in cross section, and with the groove 30 annular, the initial opening of the by-pass passage is very minute and the by-passing of fluid can thus be very accurately controlled, resulting in greatly enhanced operation of the valve mechanism. It is also readily apparent that the flow of the by-pass fluid is longitudinally of the bore 11, which eliminates the churning of the by-pass fluid which is normally present when the flow of the fluid is not directed longitudinally of the valve mechanism as herein.

While the invention has been shown in the drawing and has been described in a preferred embodiment, it is not intended that the invention is to be limited thereby to the specific construction shown. On the contrary it is intended to cover all modifications and alternative constructions falling within the spirit and scope of the invention as defined in the appended claims.

I claim as my invention:

1. A valve mechanism comprising, in combination, a casing having a bore therein closed at one end to form a valve chamber, a fluid inlet port opening to said chamber and an outlet port leading from said chamber, a hollow piston valve slidable in said bore controlling said outlet port, said valve having a closed end subject to the pressure of the fluid in said valve chamber and urged thereby toward open position, means biasing said valve toward closed position, and by-pass means including a port in communication with the interior of said valve, a passage in the casing constantly open at one end to receive a portion of the fluid flowing through the inlet port and opening at the other end to the bore spaced inwardly of the end thereof, and balanced openings in said valve spaced from the closed end thereof and movable with said valve relative to said passage to control flow from said passage to the interior of said valve.

2. A valve mechanism comprising, in combination, a casing having a bore therein closed at one end to form a valve chamber, a fluid inlet port opening to said chamber, and an outlet port leading from said chamber through the closed end of the bore, a hollow piston valve slidable in said bore controlling said outlet port, said valve having an operative end subject to the pressure of the fluid in said valve chamber and urged thereby toward its open and by-passing positions, means biasing said valve toward closed position, a by-pass port communicating with the interior of said valve, an annular groove opening to the bore spaced from the valve chamber portion of the bore, a plurality of passages in the casing communicating at one end with said groove and constantly communicating at the other end with said valve chamber, said groove being normally blocked by said valve when the valve is closed, and a plurality of radial ports in said valve spaced inwardly from the operative end thereof adapted to register with said groove when said valve is shifted to its by-passing position.

3. A valve mechanism comprising, in combination, a casing having a bore therein and opening through at least one end thereof, a bushing closing the open end of said bore and including an outlet port, a sleeve in said bore having its end spaced from the end of said bushing to form therebetween a valve chamber, a fluid inlet port leading to said chamber, a hollow piston valve slidable in said sleeve and having a closed operative end controlling said outlet port, said valve being subject to the pressure of the fluid in said valve chamber and urged thereby toward open position, means biasing said valve toward closed position, a by-pass port communicating with the interior of said valve, a by-pass passage formed in said sleeve communicating at one end with the valve chamber and at the other end opening to the interior of said sleeve at a point spaced from the end of said sleeve, and an opening through said valve spaced from the operative end thereof controlling communication between the said by-pass passage and the interior of said valve.

4. A valve mechanism comprising, in combination, a casing having a bore therein and opening through at least one end thereof, a bushing closing the open end of said bore and including an outlet port, a sleeve in said bore having its end spaced from the end of said bushing to form therebetween a valve chamber, a fluid inlet leading to said chamber, a hollow piston valve slidable in said sleeve and having a closed operative end controlling said outlet port, said valve being subject to the pressure of the fluid in said valve chamber and urged thereby toward open position, means biasing said valve toward closed position, a by-pass port communicating with the interior of said valve, a annular internal groove formed in said sleeve spaced from the end thereof, a plurality of longitudinally extending passages opening through the end of said sleeve to communicate with said valve chamber and communicating at the other end with said annular groove, and a plurality of small radial ports formed in said piston spaced from the operative end thereof and adapted to register with said groove after said piston valve has been opened a predetermined amount.

5. A valve mechanism comprising, in combination, a casing having a bore therein one end of which forms a valve chamber, a fluid inlet port opening to said chamber, and an outlet port leading from said chamber, a valve slidable in said bore controlling said outlet port, said valve being subject to the pressure of the fluid in said valve chamber and urged thereby toward open position, means biasing said valve toward closed position, an annular by-pass passage surrounding and separated from said bore, a passage communicating at one end with said annular passage and at the other end with the other end of said bore, and a by-pass port in the casing and controlled by said valve operable under predetermined conditions to complete communication between said valve chamber and said annular passage.

6. A valve mechanism comprising, in combination, a casing having a bore therein one end of which forms a valve chamber, a fluid inlet port opening to said chamber and an outlet port leading from said chamber, a hollow piston valve slidable in said bore having a closed operative end controlling said outlet port and an open end, said valve being subject to the pressure of the fluid in said valve chamber and urged thereby toward open position, means biasing said valve toward closed position, an annular by-pass passage surrounding and separated from said bore, a passage extending longitudinally of said casing and communicating at one end with said annular passage and at the other end with said bore at the open end of said valve, and by-pass means governed by said piston valve operable under predetermined conditions to complete communication between said valve chamber and said annular passage through the interior of said piston valve.

7. A valve mechanism comprising, in combination, a casing having a bore therein, a fluid inlet port opening to said bore at one end thereof and an outlet port leading longitudinally from the bore, a sleeve in said bore having its ends spaced from the ends of the bore to form a valve chamber at one end and a second chamber at the other end, a piston valve slidable in said sleeve having one end controlling said outlet port, said valve being subject to the pressure of the fluid in said valve chamber and urged thereby toward open position, means biasing said valve toward closed position, an annular by-pass passage surrounding said sleeve, a passage formed in said sleeve and extending longitudinally thereof communicating at one end with said annular passage and at the other end with said second chamber, a passage in said sleeve communicating at one end with said valve chamber and at its other end with said bore at a point separated from the valve chamber, and a passage through said piston valve operable when the valve is open to connect said last mentioned passage and said second chamber.

8. A valve mechanism comprising, in combination, a casing having a bore therein, a bushing screw-threaded into one end of said bore and having a fluid outlet port therein, a plug screw-threaded into and closing the other end of said bore, a sleeve positioned in said bore intermediate its ends cooperating with said bushing to form a valve chamber at one end of the bore and with said plug to form a second chamber in the other end of said bore, a fluid inlet port leading to said valve chamber, a hollow piston valve slidably mounted in said sleeve and subject to the pressure of fluid in said valve chamber so as to be urged thereby toward a position opening said outlet port, a coiled spring intermediate said valve and said plug urging said valve towards its closed position, a by-pass port in said casing, and means forming a by-pass from said valve chamber to said by-pass port comprising an annular groove on the external surface of said sleeve, an annular groove on the internal surface of said sleeve, a plurality of longitudinal passages in one end of said sleeve communicating with said external groove and said second chamber, a plurality of longitudinal passages in the other end of said sleeve communicating with said internal groove and said valve chamber, and a plurality of circumferentially spaced and balanced radial ports in said piston valve for connecting said internal groove with said second chamber when the valve is in an open position.

9. A valve mechanism comprising, in combinaton, a casing having a bore therein, a bushing in one end of said bore and having a fluid outlet port therein, a plug closing the other end of said bore, a sleeve positioned in said bore intermediate its ends cooperating with said bushing to form a valve chamber at one end of the bore and with said plug to form a second chamber in the other end of said bore, a fluid inlet port leading to said valve chamber, a piston valve slidably mounted in said sleeve and subject to the pressure of fluid in said valve chamber so as to be urged thereby toward a position opening said outlet port, a coiled spring intermediate said valve and said plug urging said valve towards its closed position, a by-pass port in said casing extending away from the periphery of said sleeve, and means forming a by-pass from said valve chamber to said by-pass port comprising an annular groove on the external surface of said sleeve, an annular groove on the internal surface of said sleeve, a longitudinal passage in one end of said sleeve communicating with said external groove and said second chamber, a longitudinal passage in the other end of said sleeve communicating with said internal groove and said valve chamber, and a port in said piston valve for connecting said internal groove with said second chamber when the valve is in an open position.

10. A valve mechanism comprising, in combination, a casing having a bore therein closed at one end to form a valve chamber, a fluid supply passage in the casing terminating in a fluid inlet port opening to said chamber, an outlet port for said chamber, a valve slidable in said bore, having a cylindrical surface engaging said bore throughout its entire circumference, controlling said outlet port, said valve being subject to the pressure of the fluid in said valve chamber and urged thereby toward open position, means biasing said valve toward closed position, and by-pass means including a passage in the casing constantly communicating at one end with the fluid supply passage and opening at the other end to the bore at a point spaced inwardly of the end thereof, and means in said valve opening through said cylindrical surface at a point spaced from the end of said valve and movable with said valve relative to said last mentioned passage to control the by-passing of fluid by the degree of registry with the opening of said last mentioned passage to said bore.

GUNNAR A. WAHLMARK.